H. Knowles,
Reciprocating Saw Mill.
No. 629. Reissued Nov. 30, 1858.
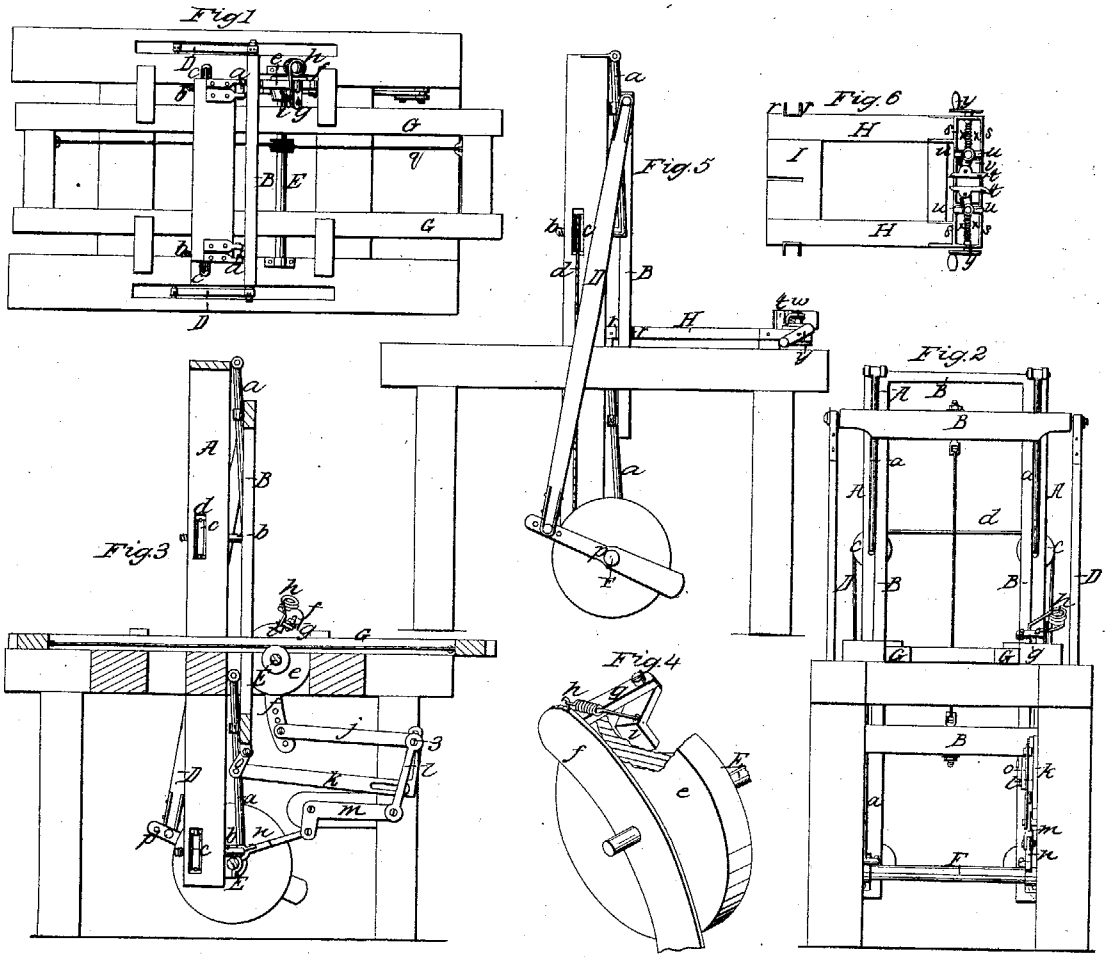
AM. PHOTO-LITHO. CO. N.Y. (OSBORNE'S PROCESS)

UNITED STATES PATENT OFFICE.

HAZARD KNOWLES, OF NEW YORK, N. Y.

IMPROVEMENT IN SAW-MILLS.

Specification forming part of Letters Patent No. 9,234, dated September 28, 1852; Reissue No. 629, dated November 30, 1858.

*To all whom it may concern:*

Be it known that I, HAZARD KNOWLES, of the city, county, and State of New York, have invented sundry new and useful Improvements in Saw-Mills; and I do hereby declare that the following is a full and exact description thereof, reference being had to the accompanying drawings, making a part of this specification.

Figure 1 of said drawings is a top view of the essential parts of my improved saw-mill as arranged for sawing logs; Fig. 2, an end view of the same; Fig. 3, a longitudinal section in the line *x x* of Fig. 1, and Fig. 4 a portion of said mill detached. Fig. 5 is a side view of my improved saw-mill as arranged for resawing boards, &c.; and Fig. 6, is a top view of a detached portion of the same.

Similar letters indicate corresponding parts in each drawing.

The first feature of novelty in my said invention consists in the employment of inclined ways for the guidance of the saw-gate when the said ways are arranged in such a manner that they must necessarily cause the saw placed in said gate to advance in the line of its plane as it descends and to retreat correspondingly backward as it rises.

The second feature of novelty in my said invention consists in so arranging the ways of the saw-gate that they can be readily adjusted to different positions, by which the action of the saw placed in said gate can be varied to suit the nature and the depth of the material operated upon.

The third feature of said invention consists in the combination, with each other, of all the ways of the saw-gate in such a manner that they can be simultaneously and uniformly varied and adjusted in any desired position while the saw-gate is in motion.

The fourth feature of my invention consists in the arrangement of the feeding apparatus in connection with the saw-gate and the adjustable ways of the same in such a manner that the feeding motion communicated thereby to the material operated upon will invariably be in perfect harmony with the cut of the saw, and consequently this latter arrangement, in connection with the third feature of my invention, enables the operator to speedily vary the amount of the action of the saw, by which he has the power of preventing any injurious strain thereupon when it may be passing through knots, and also of adapting the action of the saw to the nature and the depth of the material operated upon. The ways *a a* of the saw-gate B are hinged to the fender-posts A A, and they are all connected to each other by means of the shank-screws *b b*, which pass through female screws in the centers of the pulleys *c c*, that work freely in slots in the fender-posts, or in other suitable guides, and are all connected to each other by an endless band or chain, *d*. It will therefore be perceived that by taking hold of the said endless band or chain, and thereby imparting motion to the series of pulleys *c c*, the ways *a a* of the saw-gate can be varied in their inclination to any desired extent that may be necessary for regulating the action of the saw, and adapting to the nature of the material operated upon.

In the accompanying drawings I have represented an endless band as connecting the four pulleys *c;* but in practice I intend to make use of a chain for that purpose, and adapt the links of the same to projections and depressions on the periphery of said pulleys for the purpose of insuring perfect uniformity in their movements.

Feeding motion is imparted to the carriage G from the saw-gate in the following manner, viz: A transverse shaft, E, rests in suitable bearings under the carriage and within a short distance of the fender-posts, which shaft is connected to the carriage by means of a rope, *q*, or its equivalent, that passes around a pulley on the said shaft, and whose ends are secured to the ends of the carriage; or the said shaft may be connected to the carriage by means of a pinion or pinions on the shaft gearing into a rack or racks on the carriage. A feeding-wheel, *e*, is secured to the shaft E in the position shown in the drawings, and by the side of the said wheel *e* a lever, *f*, is also placed upon the shaft E, which works freely thereon. An arm, *g*, projects from the upper end of the lever *f* over the top of the wheel *e*. A gripper, *i*, is jointed to the under side of the arm *g*, and is drawn against the side of the wheel *e* opposite to the lever *f* by the spring *h*, as shown in the drawings. When the lever *f* is vibrated upon the shaft E, the gripper *i* will glide freely in one direction over the surface of the wheel *e*, and when moved in an opposite direction the gripper will press so firmly against the side of the said wheel as to impart its own motion thereto.

In place of the gripper *i* a spring-pawl may be combined with the arm *g* in such a manner as to act in conjunction with ratchet-teeth, either on the side or onto the periphery of the wheel *e*.

The advantage of the curvilinear movement of the feeding gripper or hand over the ordinary tangential movement of a feeding-hand consists in the capacity of the former to impart a greater degree of motion to the feeding-wheel, and also a more positive motion to the same. Motion is transmitted to the lever *f*, and consequently to the feeding-wheel *e* from the saw-gate through the medium of the link *o*, the angular lever *k*, and the bar *j*. (Shown in Fig. 3.) The said bar *j* and the slotted short arm of the lever *k* are also connected to one of the ways, *a*, of the saw-gate through the medium of the link *l*, the angular lever *m*, and the link *n*, in the manner shown by Fig. 3, by which arrangement the amount of motion imparted to the carriage G by the upward movement of the saw-gate will be governed by and exactly correspond with the laterally-advancing motion imparted to the saw-gate by its inclined ways *a a* during the downward movement of said gate. If a greater degree of inclination be given to the ways *a a* of the saw-gate, the pivot *z*, which unites the link *l* and the bar *j* to the short end of the lever *k*, will be moved upward in the slot in that portion of said lever, and thereby cause an increased amount of motion to be imparted by the said lever and its connections to the carriage G, which will be exactly in harmony with the increased amount of laterally advancing and receding movements which will be imparted to the saw-gate by the said increased inclination of its ways, and vice versa.

For slitting or resawing plank, boards, &c., a mill may be constructed in the following exceedingly simple manner, viz: Combine with the fender-posts of a suitable frame the adjustable ways *a a* and a light saw-gate, B, substantially as represented in the accompanying drawings. Then place upon suitable bearings a carriage, H, Fig. 6, and connect it to the sides of the saw-gate by means of the embracing-ledges *r r*, which are secured to the sides of said carriage. The forward end, I, of said carriage may have a slit for the saw to play in, and a fence may be secured to the said forward end of the carriage, and a pressure-roller may be combined with said fence in any suitable manner for holding the board or plank in proper position to be operated upon by the saw. At the rear end of the carriage H a pair of spring-clamps, *t t c*, are combined therewith and with each other in such a manner that when the carriage is moved rearward during the downward stroke of the saw the said clamps will glide freely over the sides of the board, and when the carriage is moved forward by the upward stroke of the saw the said clamps will grip the board and carry it forward to be again acted upon by the saw. The jaws *t t* of the said spring-clamp are arranged and operated in the following manner, viz: The said jaws are connected to boxes *u u* by means of the short arms *v v*, which have a forward inclination. The boxes *u u* are held between the ways *s s* in such a manner that they are allowed to slide freely between the same. Set screws *x x* pass through openings in the connecting ends of the ways *s s* and pass into female screws in the boxes *u u*. Springs *w w* are connected to the top of the boxes *u u* and press rearward against the front side of the bars *v v* for the purpose of causing the jaws *t t* to bear lightly against the board or plank and prevent the said jaws from gliding over the same when they are moved forward. It will therefore be perceived that when the carriage H is moved rearward the arms *v v* (having nearly a free forward play) will allow the jaws *t t* to slide over the board which is placed between the same; and when the said carriage is moved forward the light pressure of the jaws *t t* upon the board will cause them to incline the bars *v v* toward the rear, and thereby force the said jaws inward upon the board embraced by the same with sufficient force to cause the said board to be carried forward with the carriage. The set screws *x x* and the cranks *y y* upon the same enable the position of the feeding-clamps to be so changed as to adapt them to the varying thicknesses of the planks which may be operated upon.

My improved manner of arranging and operating reciprocating saws has the following advantages, viz: First, the saw being placed in a straight position within its gate can be much more uniformly and tightly strained than can possibly be accomplished with a saw which is placed in an oblique position with its gate, and consequently the teeth of the saw in my improved mill have a firmer and more uniform action upon the wood than the teeth of the ordinary overhanging saws, and therefore is less liable to injury, and can safely be placed in a much lighter gate; second, by means of the peculiar arrangement of the respective parts of my improved saw-mill every saw-tooth within the range of the length of stroke of the saw is unerringly compelled to perform exactly the same amount of work, whereas with the ordinary overhanging saw it not unfrequently happens that only a small proportion of the teeth which pass through a log or plank perform any cutting service, and for the obvious reason that the degree of the inclination of said saw, the length of its stroke, the amount of the feed, and the depth of the material operated upon must be all in perfect harmony with each other to enable the regular cutting-teeth of the saw to be all brought into action, and this can rarely if ever occur.

Having thus fully described my new and useful improvements in saw-mills, what I claim therein as new, and desire to secure by Letters Patent, is—

1. So guiding the movements of the saw as to cause it to advance in the line of its plane as it descends, for the purpose of properly distributing among the teeth of said saw the cutting action which may be exerted thereby upon the material operated upon, substantially as herein set forth.

2. Arranging the ways of the saw-gate in such a manner with relation to the feeding apparatus that the amount of feeding movement imparted to the carriage will always be in perfect harmony with the amount of cutting action exerted by the saw, substantially as herein set forth.

3. Arranging the compound parts of my improved saw-mill in such a manner that the amount of cutting action exerted by the saw can be speedily varied while it is in motion from its maximum performance down to nothing, and vice versa, substantially as herein set forth.

The above specification of my improvements in saw-mills signed and witnessed this 4th day of October, 1858.

HAZARD KNOWLES.

Witnesses:

Z. C. ROBBINS,

J. QUINCY ADAMS.